US007227965B1

(12) United States Patent
Sutton

(10) Patent No.: US 7,227,965 B1
(45) Date of Patent: Jun. 5, 2007

(54) PILLOW IN THE FORM OF A STUFFED TOY OR 3-D CHARACTER TOY HAVING TWO HEADPHONE SPEAKERS MOUNTED ON THE EARS OF THE TOY

(75) Inventor: Joseph A. Sutton, New York, NY (US)

(73) Assignee: Jay Franco & Sons, Inc., New York, NY (US)

( * ) Notice: Subject to any disclaimer, the term of this patent is extended or adjusted under 35 U.S.C. 154(b) by 0 days.

(21) Appl. No.: 11/409,902

(22) Filed: Apr. 24, 2006

(51) Int. Cl.
*G06F 19/00* (2006.01)

(52) U.S. Cl. ........................... 381/124; 5/904; 446/297

(58) Field of Classification Search ................ 381/124, 381/370, 300, 309, 1, 74, 386, 388, 301; 5/904, 639, 656; 446/297–300, 302, 330, 446/29, 175, 318, 397, 416, 143; 700/94
See application file for complete search history.

(56) References Cited

U.S. PATENT DOCUMENTS 4,110,583 A * 8/1978 Lepper ....................... 381/382
4,972,533 A * 11/1990 Brown ....................... 5/413 R
6,044,161 A * 3/2000 Lee ............................ 381/301
6,560,802 B2 * 5/2003 Fujii ............................. 5/639
6,692,330 B1 * 2/2004 Kulick ....................... 446/297

* cited by examiner

*Primary Examiner*—Vivian Chin
*Assistant Examiner*—Lun-See Lao
(74) *Attorney, Agent, or Firm*—Ezra Sutton, Esq.

(57) ABSTRACT

A pillow in the form of a stuffed toy or 3-dimensional character toy having two headphone speakers on the ears of the toy. The stuffed toy pillow includes a head with ears and eyes, a body, arms and legs. The toy includes means for connection to an audio player. The connection means includes a plug receptacle for receiving and electrically connecting to an outlet plug of the audio player. The head of the toy includes a pair of headphones disposed on the ears of the toy; wherein the headphones include outwardly facing speakers. The speakers are electrically connected to the plug receptacle for allowing a user to listen to sound from the audio player through the headphone speakers. The body of the toy is used as a pillow for receiving a user's head thereon to listen to sound or music from the audio player.

15 Claims, 5 Drawing Sheets

PILLOW IN THE FORM OF A STUFFED TOY OR 3-D CHARACTER TOY HAVING TWO HEADPHONE SPEAKERS MOUNTED ON THE EARS OF THE TOY

FIELD OF THE INVENTION

The present invention relates to a pillow in the form of a stuffed toy or 3-dimensional character toy with two headphone speakers mounted on the ears. The pillow is connected to an audio player for producing audio sound or music for use as an entertainment device for children and young adults. More particularly, the two speakers face outwardly so the user can share music with the stuffed toy.

BACKGROUND OF THE INVENTION

Stuffed toys, animals, dolls and 3-dimensional characters, as well as backrests and pillows, being used as entertainment devices are well-known in the prior art. These devices for the most part do not readily induce relaxation for the onset of sleeping by the user, even when using the above devices.

There remains a need for a pillow in the form of a stuffed toy or 3-dimensional character toy with two headphones having outwardly facing speakers connected to the head of the stuffed toy for producing audio sounds or music from an audio player that is connected to the stuffed toy. Additionally, the pillow with speakers would not need batteries or an amplifier to play sound or music coming from the audio player.

DESCRIPTION OF THE PRIOR ART

Pillows, headrests, cushions, backrests and stuffed toys having various accessories, designs, configurations, structures and materials of construction have been generally disclosed in the prior art. For example, U.S. Pat. No. 6,044,161 to LEE discloses a pillow speaker for use as a combination headrest and sound delivery system for transmitting sounds, including music to a person's head. The pillow speaker comprises a pillow headrest having an upper surface for receiving and supporting a person's head. A lower body portion is adapted for support from an exterior stable surface. The pillow speaker is constructed from a homogeneous flexible material. A pair of spaced apart loud speakers are mounted through the upper surface, within the lower body portion. This prior art patent does not disclose or teach the concept and structure of a pillow in the form of a stuffed toy having two headphone speakers for connection to an audio player for producing music or sound.

U.S. Pat. No. 5,313,678 to REDEWILL discloses an acoustical pillow adapted to support the head of a user including a core having an axis extending through a central section and opposing end sections. The end sections are bent from the central section and are generally coextensive in a common direction to provide the core with a U-shaped configuration. A spring is included for biasing the end sections toward each other to provide a snug fit relationship with the ears of the user and thereby attenuate environmental sound. The pillow can be provided with speakers which can be connected through a conductor to an audio source such as a cassette or CD player. This prior art patent does not disclose or teach the concept and structure of a pillow in the form of a stuffed toy having two headphone speakers for connection to an audio player for producing music or sound.

U.S. Pat. No. 4,440,443 to NORDSKOG discloses an improved resilient flexible headrest that is inflated with air or fluid, or is filled with foamed plastic material, preferably of various resiliencies. The headrest can be formed of plastic, cloth or the like, and has a cavity within which the upper end of the backrest of a chair, couch or the like is receivable. The body of the headrest has forwardly extending privacy wings which may be hinged and which include sound system speakers or the like. In one embodiment, the headrest may be U-shaped in plan view and include one or more straps and cinch means to releasably hold the headrest in place around the top of a backrest. The headrest can incorporate one or more sound system external loud speakers. This prior art patent does not disclose or teach the concept and structure of a pillow in the form of a stuffed toy having two headphone speakers for connection to an audio player for producing music or sound.

U.S. Pat. No. 6,814,709 to SCHWARTZ et al. discloses a cushion/backrest including an integrated reading lamp tethered at the end of a flexible member for providing the user with a source of light for reading or watching television. The cushion may also include built-in massage motors for providing the user with a massaging action to the back. Controls for adjusting the massaging action and the reading lamp may be incorporated in an armrest. The bed rest cushion may also comprise a speaker or a plurality of speakers located in the headrest or armrests. The speakers may be capable of generating sound waves such as music from an audio source located within the bed cushion or from an external audio source. This prior art patent does not disclose or teach the concept and structure of a pillow in the form of a stuffed toy having two headphone speakers for connection to an audio player for producing music or sound.

U.S. Pat. No. 5,074,821 to McKEEFERY et al. discloses a dual track recording device, such as a tape recorder. On a second track of the recorder an animation signal is recorded characterized by the signal having a frequency at any given time indicative of the then currently desired animation condition. A character-type toy is provided having a tape playback unit therein for playing back such pre-recorded dual track tapes. The character-type toy has an amplifier and speaker for reproducing the audio information, and a servo motor having a drive system for moving the character mouth elements and eyes with the desired animation. This prior art patent does not disclose or teach the concept and structure of a pillow in the form of a stuffed toy having two headphone speakers for connection to an audio player for producing music or sound.

U.S. Design Patent No. D311,472 to GILES discloses an ornamental design of a combined pillow, cassette player and speakers. This ornamental design has a "butterfly" shaped pillow with integral speakers that can be connected to the cassette player or other peripheral audio devices. This prior art patent does not disclose or teach the concept and structure of a pillow in the form of a stuffed toy having two headphone speakers for connection to an audio player for producing music or sound.

None of the aforementioned prior art patents teach or disclose a pillow in the form of a toy having outwardly facing headphone speakers for connection to an audio player for use by children and young adults, wherein the speakers are mounted on ears of the toy.

Accordingly, it is an object of the present invention to provide a pillow in the form of a stuffed toy or a 3-dimensional character toy having headphone speakers for connection to an audio player therein, such as a CD player, an Ipod, an MP3 player, a mini portable radio, or a mini tape cassette.

Another object of the present invention is to provide a pillow in the form of a toy that includes outwardly facing headphone speakers for allowing the user of the pillow to listen to music or sound.

Another object of the present invention is to provide a pillow that includes a plug receptacle for connection to the audio player, and a connection wire electrically connected to the headphone speakers.

Another object of the present invention is to provide a pillow in the form of a stuffed toy which is selected from a group consisting of stuffed toy animals or dolls such as a lion, a tiger, a bear, a horse, a pony, a bird, a monkey, a gorilla, a pig, a sheep, a lamb, a cow, a calf, a dog, a puppy, a cat, a kitten, a dinosaur, a rabbit, a bunny, a Raggedy-Anne or Andy doll, and the like.

Another object of the present invention is to provide a pillow having headphones speakers that is easy to use and is durable and easily cleanable for repeated use by the user.

A further object of the present invention is to provide a pillow having headphone speakers that can be mass-produced in an automated and economical manner and is readily affordable by the consumer.

SUMMARY OF THE INVENTION

In accordance with the present invention, there is provided a pillow in the form of a stuffed toy or 3-dimensional character toy having two headphone speakers on the ears of the toy. The stuffed toy pillow includes a head with ears and eyes, a body, arms and legs. The toy includes means for connection to an audio player. The connection means includes a plug receptacle for receiving and electrically connecting to an outlet plug of the audio player. The head of the toy includes a pair of headphones disposed on the ears of the toy; wherein the headphones include outwardly facing speakers. The speakers are electrically connected to the plug receptacle for allowing a user to listen to sound from the audio player through the headphone speakers. The body of the toy is used as a pillow for receiving a user's head thereon to listen to sound or music from the audio player.

BRIEF DESCRIPTION OF THE DRAWINGS

Further objects, features and advantages of the present invention will become apparent upon the consideration of the following detailed description of the present-preferred embodiment when taken in conjunction with the accompanying drawings, wherein.

DETAILED DESCRIPTION OF THE EMBODIMENTS PREFERRED EMBODIMENT 10

Figure 1:
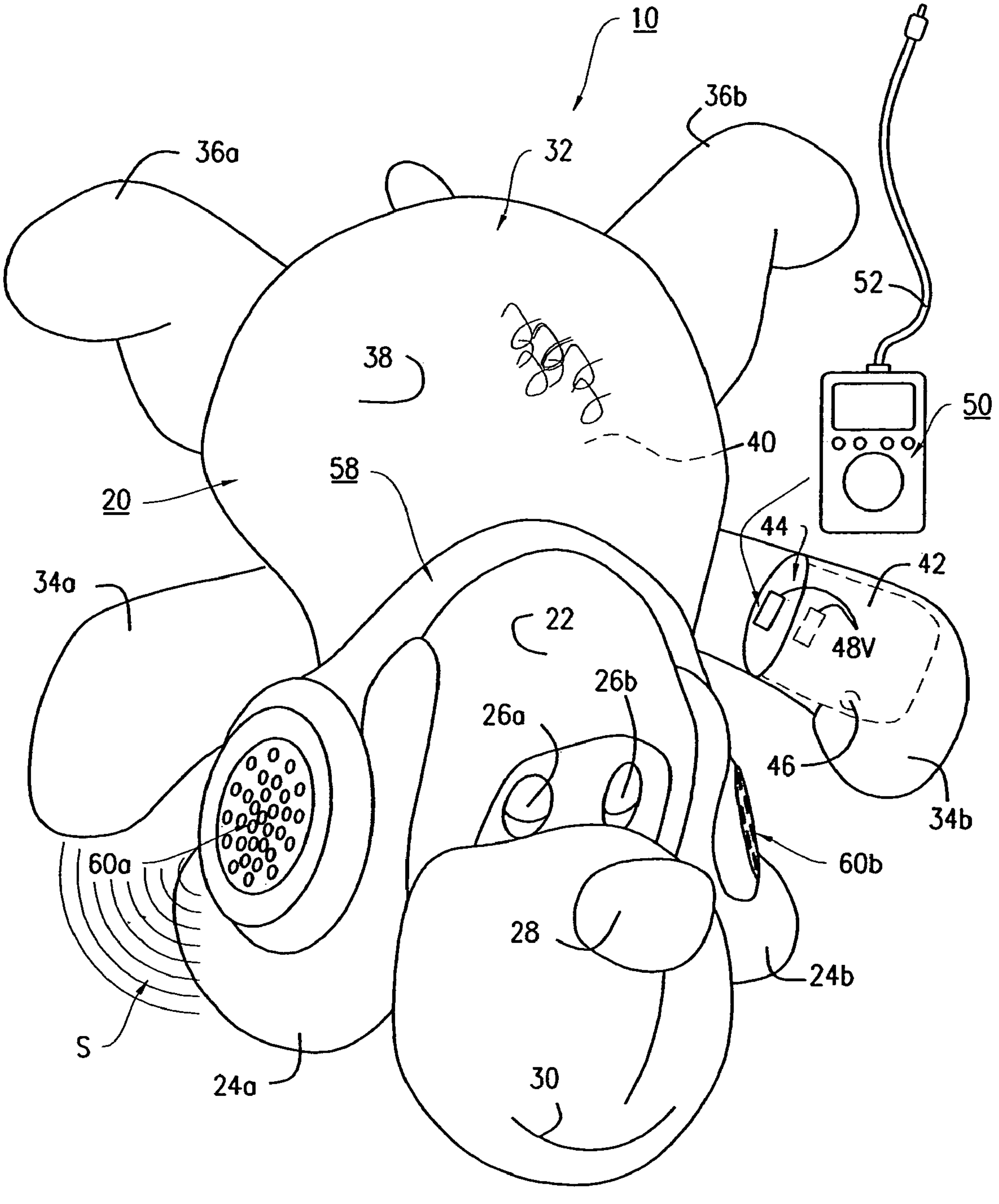
FIG. 1 is a perspective view of the pillow with speakers of the preferred embodiment of the present invention showing an MP3 player being connected to the pillow.
Figure 2:
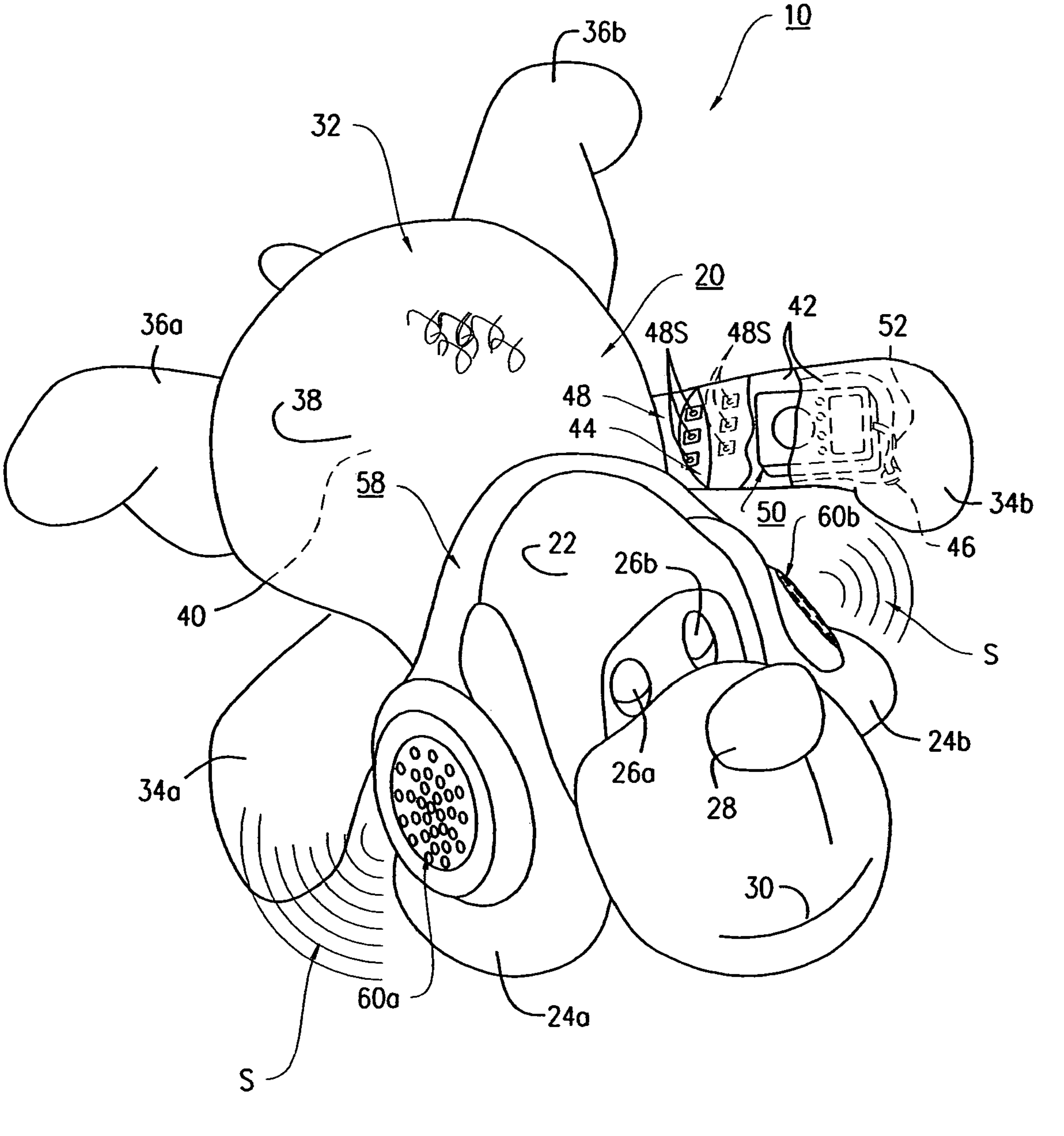
FIG. 2 is a perspective view of the pillow with speakers of the present invention showing an MP3 player plugged into a plug receptacle.
Figure 3:
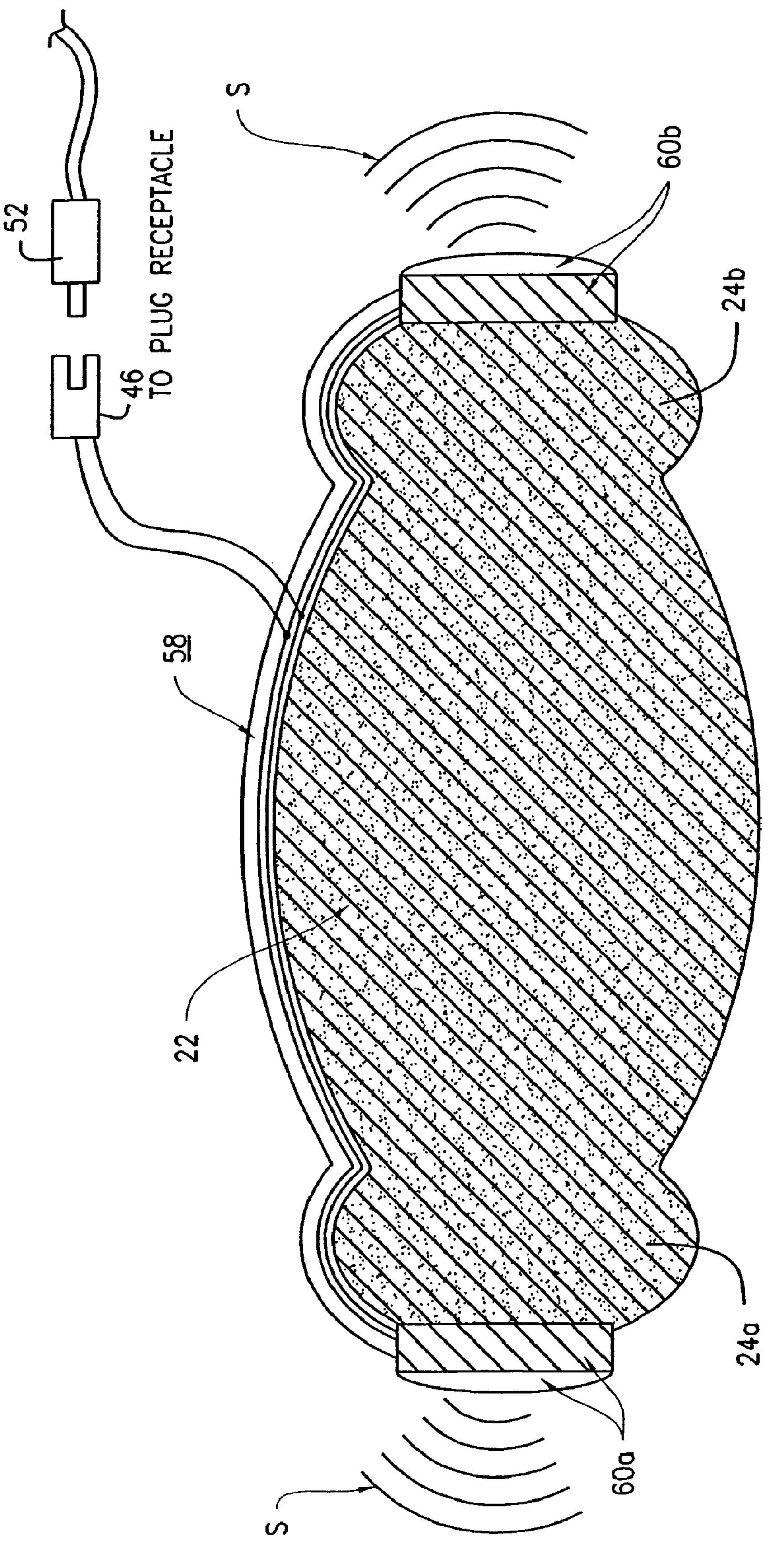
FIG. 3 is a cross-sectional view of the pillow with speakers of the present invention showing a pair of speaker headphones being electrically attached to the MP3 player.

The pillow 10 in the form of a stuffed toy having speakers 60*a* and 60*b* with a pocket compartment 42 for receiving an audio player 50 therein and its component parts of the present invention are represented in detail by FIGS. 1 through 3 and 5 of the drawings. The pillow 10 is used for entertaining a child, a teenager or young adult with audio/sound (S) such as music, stories and the like being produced by the audio player 50. As shown in FIGS. 1 to 3, the pillow 10 includes a pillow housing 20 having a head 22 with ears 24*a* and 24*b*, eyes 26*a* and 26*b*, a nose 28, and a mouth 30. The pillow housing 20 also includes a body 32 having a pair of arms 34*a* and 34*b* and a pair of legs 36*a* and 36*b* being attached thereto. The body 32 includes a back section 38 and a stomach section 40. It is understood that the pillow 10 may be a stuffed toy or a 3-dimensional character toy selected from the group consisting of a lion, a tiger, a bear, a pony, or dinosaur, a horse, a pig, a bird, a monkey, a gorilla, a sheep, a lamb, a cow, a calf, a dog, a puppy, a cat, a kitten, and a doll.

One of the arms 34*a* includes an optional pocket compartment 42 having a pocket opening 44 for receiving an audio player 50 therein. The pillow 10 includes a plug receptacle 46 for receiving and electrically connecting to an outlet plug 52 of the audio player 50, as shown in FIG. 2 of the drawings. The audio player 50 may be in the form of a CD player, an Ipod, an MP3 player, a mini radio and a mini cassette. The pocket opening 44 includes closing means 48 for retaining and holding the audio player 50 within the pocket compartment 42. The closing means 48 for the pocket opening 44 includes hook and loop fasteners 48V, male and female snap fasteners 48S, a zipper 48Z, buttons, string ties and the like.

The head 22 of the plush toy pillow 10 includes a headphone set 58 having a pair of headphone stereo speakers 60*a* and 60*b* that are positioned on each of the ears 24*a* and 24*b*, as shown in FIGS. 1 and 3 of the drawings. Each of the speakers 60*a* and 60*b* are electrically connected by a connection wire 64 to the plug receptacle 46, allowing a user to listen to the audio/sound (S) from the audio player 50 through the speakers 60*a* and 60*b*.

Figure 5:
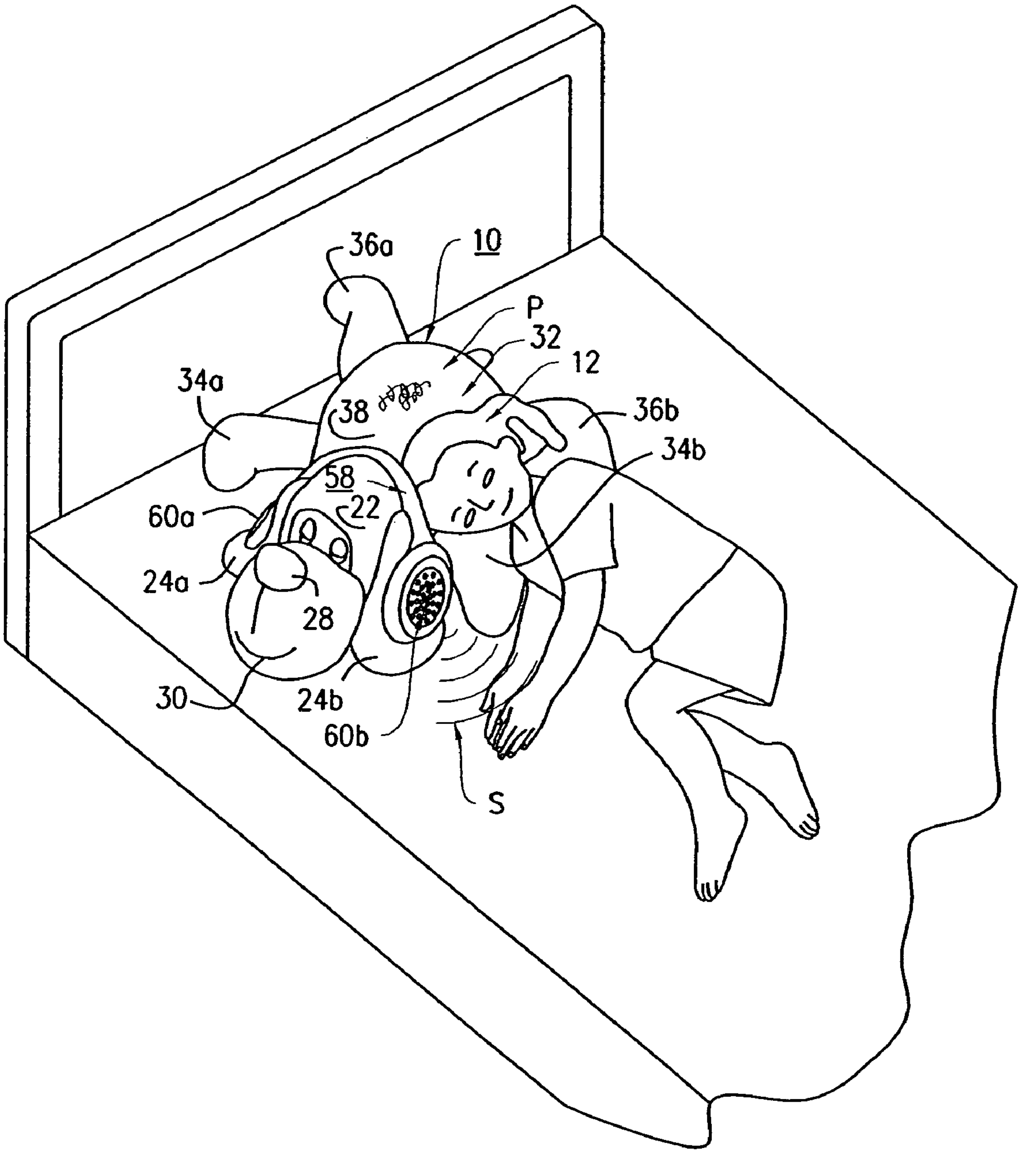
FIG. 5 is a perspective view of the pillow with speakers of the present invention showing a user listening to the MP3 player with the pillow and speakers being in operational use.

Additionally, as depicted in FIG. 5, the body 32 of the plush toy pillow 10 is used as a pillow for receiving the user's head 12 thereon. The headphone speakers 60*a* and 60*b* do not include batteries and are not connected to an amplifier.

PREFERRED EMBODIMENT 100

Figure 4:
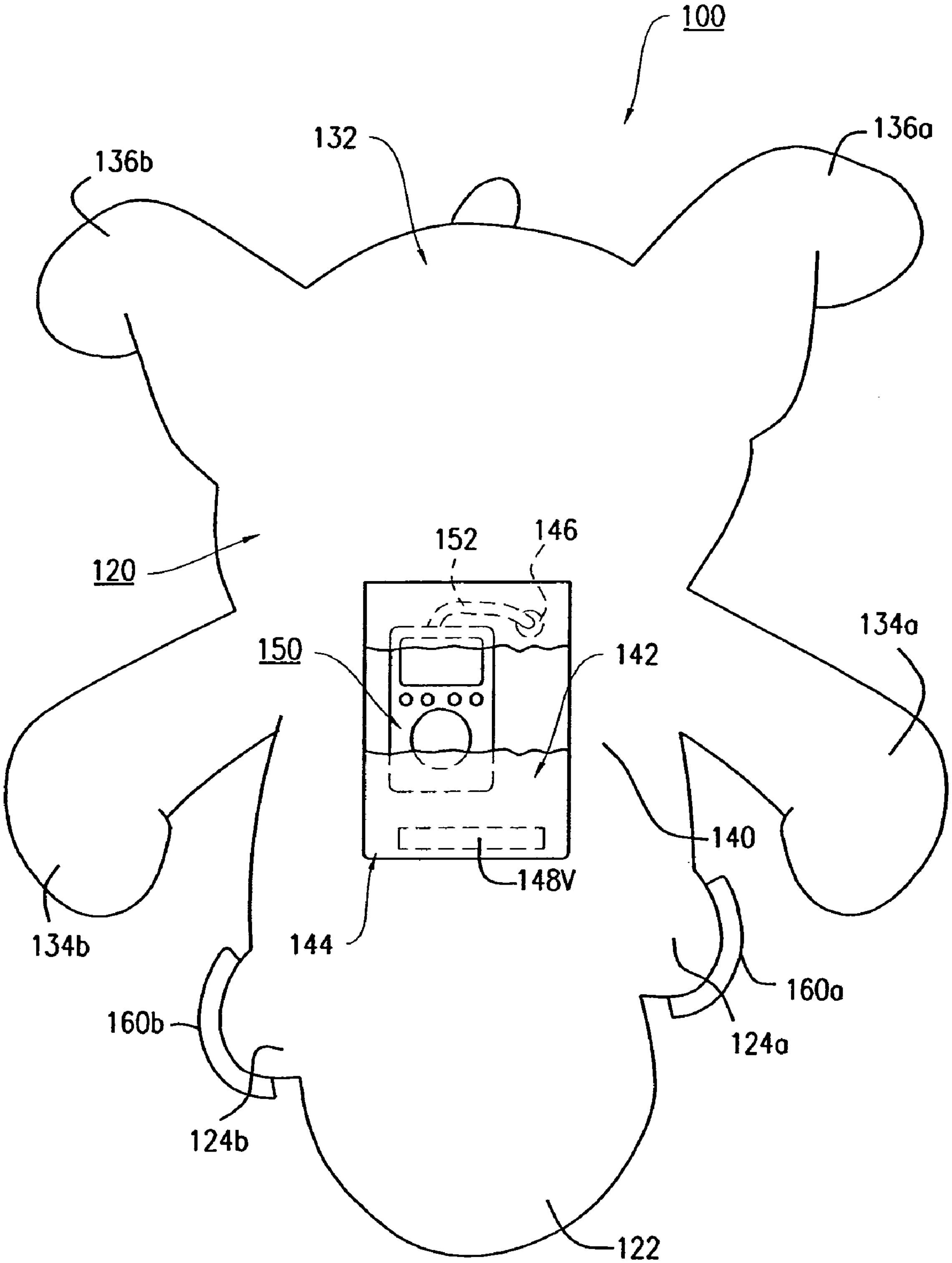
FIG. 4 is a perspective view of the pillow with speakers of the present invention showing the MP3 player plugged into a plug receptacle.

The pillow 100 and its component parts of the alternate embodiment of the present invention are represented in detail by FIGS. 4 and 5 of the patent drawings. Elements illustrated in FIG. 4 which correspond to the elements described above with references to FIGS. 1 through 3 have been designated by corresponding reference numbers increased by one hundred. The alternate embodiment 100 is similarly constructed and operates in the same manner as the preferred embodiment 10, unless it is otherwise stated.

All aspects of the alternate embodiment of the pillow 100 are the same as the preferred embodiment of the plush toy pillow 10 except for a pocket compartment 142 having a pocket opening 144 being positioned within a stomach section 140 of the body 132 of pillow housing 120. Pocket opening 144 of pocket compartment 142 is also used for receiving of the audio player 150 therein. Also, the back portion/section 138 of the pillow housing 120 is used as the pillow area P for receiving the user's head 12 thereon.

In all other respects, the pillow 100 of the alternate embodiment is exactly the same as the plush toy pillow of the preferred embodiment 10, except for the placement of the pocket compartment 142 being disposed within the stomach section 140 of body 132 of pillow housing 120, as shown in FIG. 4 of the drawings.

OPERATION OF THE PRESENT INVENTION

As shown in FIGS. 1 to 3 and 5, the pillow 10 having the audio player 50 operates in the following manner: The user initially opens the closing means 48, such as the hook and loop fasteners 48V, on pocket opening 44. Next, the user would then insert the audio player 50, such as an MP3 player, into the pocket compartment 42 and then plug in the outlet plug 52 of the audio player 50 into the plug receptacle 46 for electrically connecting to each of the speakers 60*a* and 60*b*, as shown in FIGS. 2 and 3 of the drawings. The user then closes the hook and loop fasteners 48V on pocket opening 44, as shown in FIGS. 1 and 2 of the drawings. The user is now able to listen to the audio/sound (S) coming from the outwardly facing speakers 60*a* and 60*b* of the audio player 50 while laying his/her head 12 on the plush toy pillow 10 while relaxing, as shown in FIG. 5 of the patent drawings.

ADVANTAGES OF THE PRESENT INVENTION

Accordingly, an advantage of the present invention is that it provides for a pillow in the form of a stuffed toy or a 3-dimensional character toy having headphone speakers for connection to an audio player therein, such as a CD player, an Ipod, an MP3 player, a mini portable radio, or a mini tape cassette.

Another advantage of the present invention is that it provides for a pillow in the form of a toy that includes outwardly facing headphone speakers for allowing the user of the pillow to listen to music or sound.

Another advantage of the present invention is that it provides for a pillow that includes a plug receptacle for connection to the audio player, and a connection wire electrically connected to the headphone speakers.

Another advantage of the present invention is that it provides for a pillow in the form of a stuffed toy which is selected from a group consisting of stuffed toy animals or dolls such as a lion, a tiger, a bear, a horse, a pony, a bird, a monkey, a gorilla, a pig, a sheep, a lamb, a cow, a calf, a dog, a puppy, a cat, a kitten, a dinosaur, a rabbit, a bunny, a Raggedy-Anne or Andy doll, and the like.

Another advantage of the present invention is that provides for a pillow having headphone speakers that is easy to use and is durable and easily cleanable for repeated use by the user.

A further advantage of the present invention is that it provides for a pillow having headphone speakers that can be mass-produced in an automated and economical manner and is readily affordable by the consumer.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A pillow in the form of a stuffed toy or 3-dimensional character toy having a headset thereon including two headphone speakers on the ears of the toy, comprising:

a) said toy having a 3-dimensional head with ears and eyes, a body, arms and legs; said headset including two headphone speakers connected by a headset housing having connecting wires in said headset housing; said headset housing extending over said head of said toy between said headphone speakers;

b) said toy having means for connection to an audio player;

c) said connection means including a plug receptacle for receiving and electrically connecting to an outlet plug of said audio player; said plug receptacle being connected to said connecting wires in said headset housing for connecting to each of said headphone speakers;

d) said 3-dimensional head of said toy including a pair of headphone speakers disposed on said ears of said toy; wherein said headphone speakers face outwardly from said head of said toy;

e) said speakers being electrically connected to said plug receptacle for allowing a user to listen to sound from said audio player through said headphone speakers; and f) said body of said toy being 3-dimensional and used as a pillow for receiving a user's head thereon to listen to sound or music from said audio player.

2. A pillow having speakers in accordance with claim 1, wherein said headphone speakers are mounted on said ears of said toy; and said ears are movable with respect to the head of the toy.

3. A pillow having speakers in accordance with claim 1, wherein said outwardly facing speakers include faces having holes therein.

4. A pillow having speakers in accordance with claim 1, wherein said pillow includes a pocket having a pocket opening for retaining and holding said audio player within the compartment of said pocket.

5. A pillow having speakers in accordance with claim 4, wherein said pocket opening includes closing means for closing said pocket opening, and wherein closing means includes hook and loop fasteners, male and female snap fasteners, a zipper, buttons or string ties.

6. A plush toy having integral speakers in accordance with claim 1, wherein said audio player is selected from the group consisting of a CD player, an Ipod, an MP3 player, a mini radio, and a mini tape cassette.

7. A pillow having speakers in accordance with claim 1, wherein said toy is selected from the group consisting of a lion, a tiger, a bear, a pony, a dinosaur, a horse, a pig, a bird, a monkey, a gorilla, a sheep, a cow, a dog, a cat, and a doll.

8. A pillow having speakers in accordance with claim 1, wherein each of said speakers are positioned in an outwardly facing direction relative to each of said ears of said toy for maximizing the sound of said audio player.

9. A pillow having speakers in accordance with claim 1, wherein said headphones are non-detachably connected to said head of said toy by stitching, stapling, glueing, laser welding, adhesives and the like.

10. A pillow in the form of a stuffed toy or 3-dimensional character toy having a headset thereon including two headphone speakers on the ears of the toy, comprising:

a) said toy having a 3-dimensional head with ears and eyes and a body; said headset including two headphone speakers connected by a headset housing having connecting wires in said headset housing; said headset housing extending over said head of said toy between said headphone speakers;

b) said toy having means for connection to an audio player including a receptacle for receiving and electrically connecting to an outlet device of said audio player; said receptacle being connected to said connecting wires in said headset housing for connecting to each of said headphone speakers;

c) said 3-dimensional head of said toy including a pair of headphone[s] speakers mounted on said ears of said toy; wherein said headphone speakers face outwardly from said head of said toy;

d) said speakers being connected to said receptacle for allowing a user to listen to sound from said audio player through said headphone speakers; and e) said body of said toy being 3-dimensional and used as a pillow for receiving a user's head thereon to listen to sound or music from said audio player.

11. A pillow having speakers in accordance with claim 10, wherein said outwardly facing speakers include faces having holes therein.

12. A pillow having speakers in accordance with claim 10, wherein said pillow includes a pocket having a pocket opening for retaining and holding said audio player within the compartment of said pocket.

13. A pillow having speakers in accordance with claim 12, wherein said pocket includes closing means for closing said pocket opening, and wherein closing means includes hook and loop fasteners, male and female snap fasteners, a zipper, buttons or string ties.

14. A plush toy having integral speakers in accordance with claim 10, wherein said audio player is selected from the group consisting of a CD player, an Ipod, an MP3 player, a mini radio, and a mini tape cassette.

15. A pillow having speakers in accordance with claim 10, wherein said toy is selected from the group consisting of a lion, a tiger, a bear, a pony, a dinosaur, a horse, a pig, a bird, a monkey, a gorilla, a sheep, a cow, a dog, a cat, and a doll.

* * * * *